(No Model.)
A. W. GRANT.
DEVICE FOR PUTTING ON RUBBER TIRES.
No. 555,480. Patented Feb. 25, 1896.
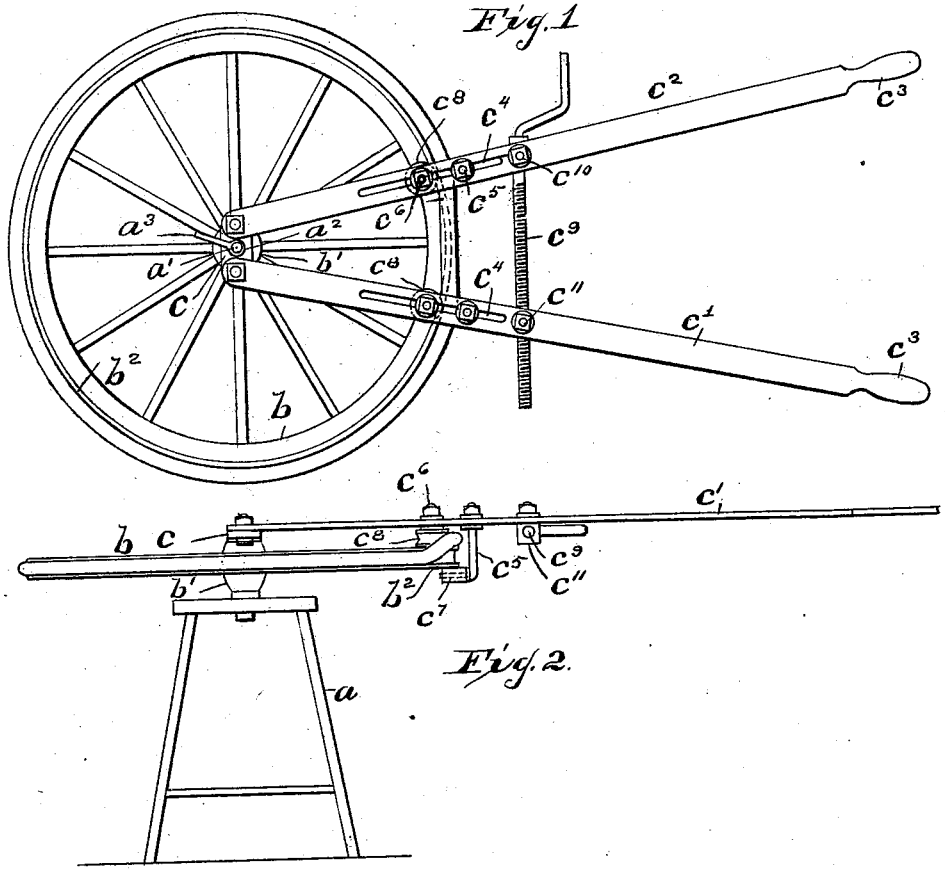
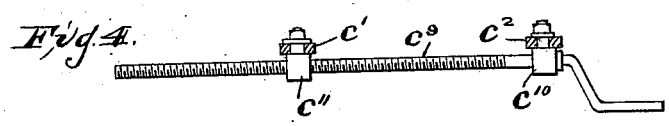
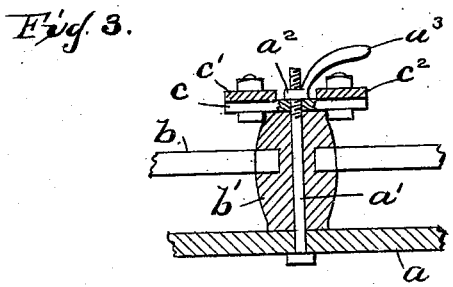
WITNESSES:
J. M. Gridley
Chas. I. Welch
INVENTOR
Arthur W. Grant
BY
ATTORNEY

UNITED STATES PATENT OFFICE.

ARTHUR W. GRANT, OF SPRINGFIELD, OHIO, ASSIGNOR TO THE RUBBER TIRE WHEEL COMPANY, OF SAME PLACE.

DEVICE FOR PUTTING ON RUBBER TIRES.

SPECIFICATION forming part of Letters Patent No. 555,480, dated February 25, 1896.

Application filed April 25, 1895. Serial No. 547,123. (No model.)

*To all whom it may concern:*

Be it known that I, ARTHUR W. GRANT, a citizen of the United States, residing at Springfield, in the county of Clark and State of Ohio, have invented certain new and useful Improvements in Devices for Putting on Rubber Tires, of which the following is a specification.

My invention relates to improvements in devices for putting rubber tires on wheels; and the object of my invention is to provide a simple device by which endless tires may be readily forced to the proper position within the wheel-felly. I attain these objects by the constructions shown in the accompanying drawings, in which—

Figure 1 is a plan view of a device embodying my invention. Fig. 2 is a side elevation of the same. Fig. 3 is a sectional elevation of the end of the same, and Fig. 4 is a detail view of the adjusting device.

Like parts are represented by similar letters of reference in the several views.

In the drawings, $a$ represents a suitable stand or support on which the wheel is secured during the operation. The stand $a$ is provided with a vertical screw-threaded standard $a'$, provided preferably with a clamping-nut $a^2$, having a handle $a^3$.

The wheel $b$ to be operated upon is placed on the stand with the standard $a'$ passing through the hub $b'$. On the top of the hub $b'$ is a cross-bar $c$, perforated to receive the standard $a'$ and having pivoted thereto on each side of said perforation bars $c'$ $c^2$, the outer ends of which are provided with suitable handles $c^3$. These bars are each provided with a slotted opening $c^4$ extending through the same. In these slotted openings are secured standards $c^5$ $c^6$, on which are journaled rollers $c^7$ $c^8$. The standards $c^5$ are each formed at their lower ends with a right-angled projection, the rollers $c^7$ being journaled on said projections in a horizontal plane, while the rollers $c^8$ are journaled in a vertical plane. The tops of the standards $c^5$ $c^6$ are preferably screw-threaded and provided with clamping-nuts, by means of which they can be secured in any desired position of adjustment in the slotted openings $c^4$.

Means may be provided for forcing the bars $c'$ $c^2$ together. I have shown this accomplished by means of a hand-screw $c^9$, which passes through suitable pivoted studs $c^{10}$ $c^{11}$ in the respective bars $c'$ $c^2$, one of said studs being screw-threaded, so that as the hand-screw is revolved the bars are moved to or from each other.

The wheel being in position on the stand and the cross-bar $c$ secured at the top of the hub, as indicated, by the clamping-screw $a^3$, the rubber tire is placed in the felly $b^2$ as far as it will go without stretching. The bars are then turned around their pivotal centers until the vertical rollers $c^8$ will engage with the inside of the tire, the horizontal rollers $c^7$ being placed under the felly, said rollers being adjusted so that the outer periphery of the vertical rollers will stand substantially flush with the outer periphery of the wheel-felly. The bars are now moved toward each other by means of the handles $c^3$, thus stretching the tire and causing it to enter the channel of the felly. If sufficient pressure cannot be secured by the handles $c^3$, then the screw-threaded handle may be turned until the bars are brought sufficiently close together to cause the tire to be distended sufficiently to pass over the side of the felly, when it will be forced by the movement of the bars into said felly. When the handles are sufficiently long to obtain the necessary leverage, the screw-threaded handle may be dispensed with.

This device is especially adapted for placing into position those tires which are provided with a steel core and in which great pressure is required to embed the core sufficiently into the rubber to permit the tire to pass over the side of the felly.

Having thus described my invention, I claim—

1. The combination with a suitable support having a vertical supporting-standard adapted to receive the axle-box of a vehicle-wheel, a supporting-bar perforated to receive said standard, said standard being screw-threaded and provided with adjusting devices for holding said bar and wheel onto said support, pivoted levers hinged to said cross-bar so as to move in opposite directions around said wheel, and rollers journaled on trunnions projecting laterally from said levers, said trunnions being supported wholly at one end so that the outer ends of said rollers are unencumbered, substantially as specified.

2. The combination with a suitable support having a standard thereon, hinged levers having laterally-projecting trunnions adjustably secured thereto, rollers on said trunnions, said levers being pivoted in the same horizontal plane, and an adjustable guide also secured to said levers, substantially as specified.

3. The combination with a support having an upwardly-projecting standard, of hinged levers supported on said standard and having vertical and horizontal rollers arranged one above the other, all of said rollers being supported on trunnions adjustably secured in slotted openings in said levers, substantially as specified.

4. The combination with a supporting-standard, a perforated cross-bar to fit on said standard, hinged bars connected to said cross-bar and having slotted openings therein, vertical and horizontal rollers journaled on trunnions secured in said slotted openings, and means, substantially as described, for connecting said hinged bars together, substantially as specified.

5. A device for putting on rubber tires consisting of pivoted bars arranged in the same plane and having adjustable trunnions extending laterally therefrom, and vertical and horizontal rollers journaled on said trunnions on each of said bars, substantially as specified.

In testimony whereof I have hereunto set my hand this 15th day of April, A. D. 1895.

ARTHUR W. GRANT.

Witnesses:
CHAS. I. WELCH,
G. M. GRIDLEY.